Patented Nov. 19, 1946

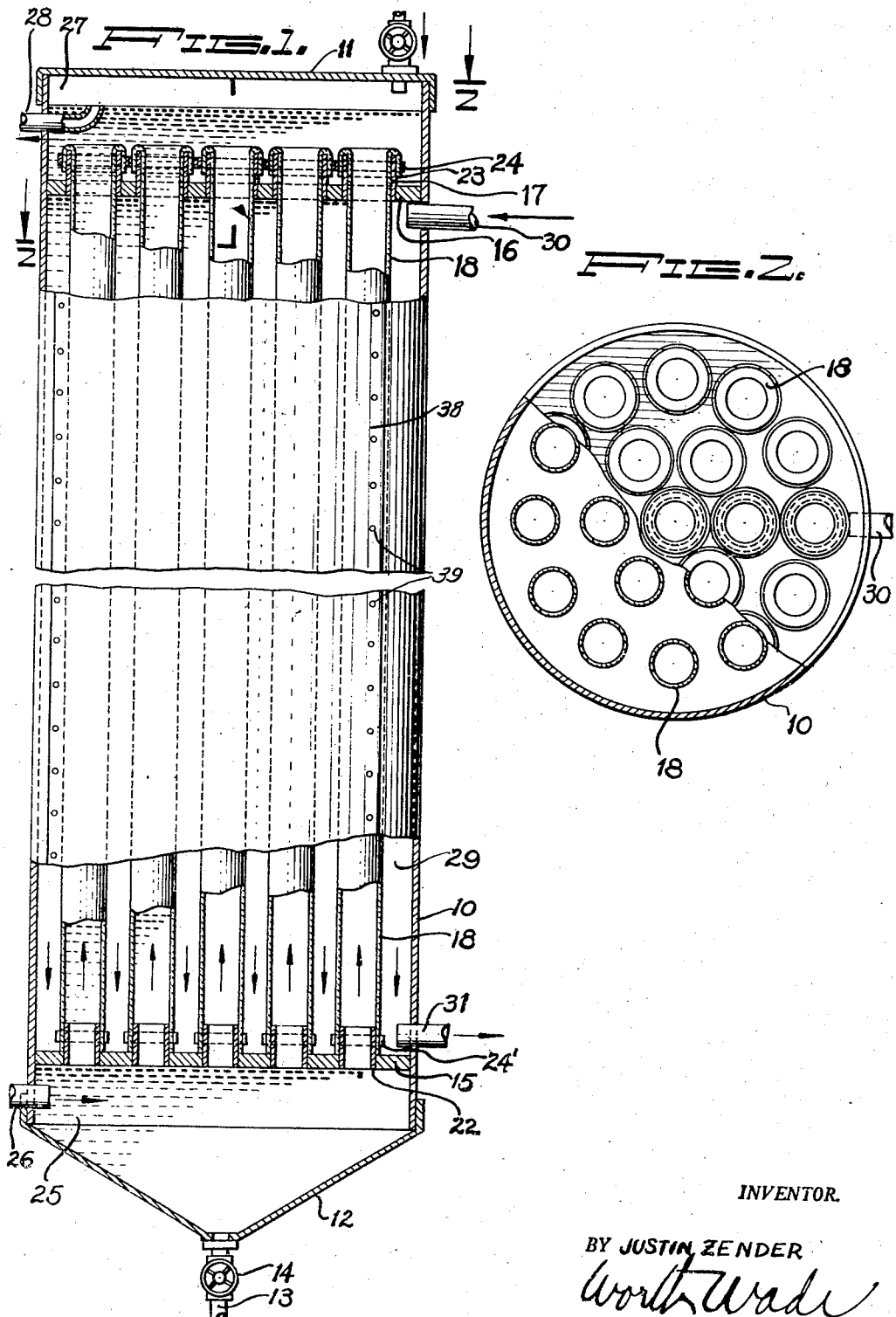

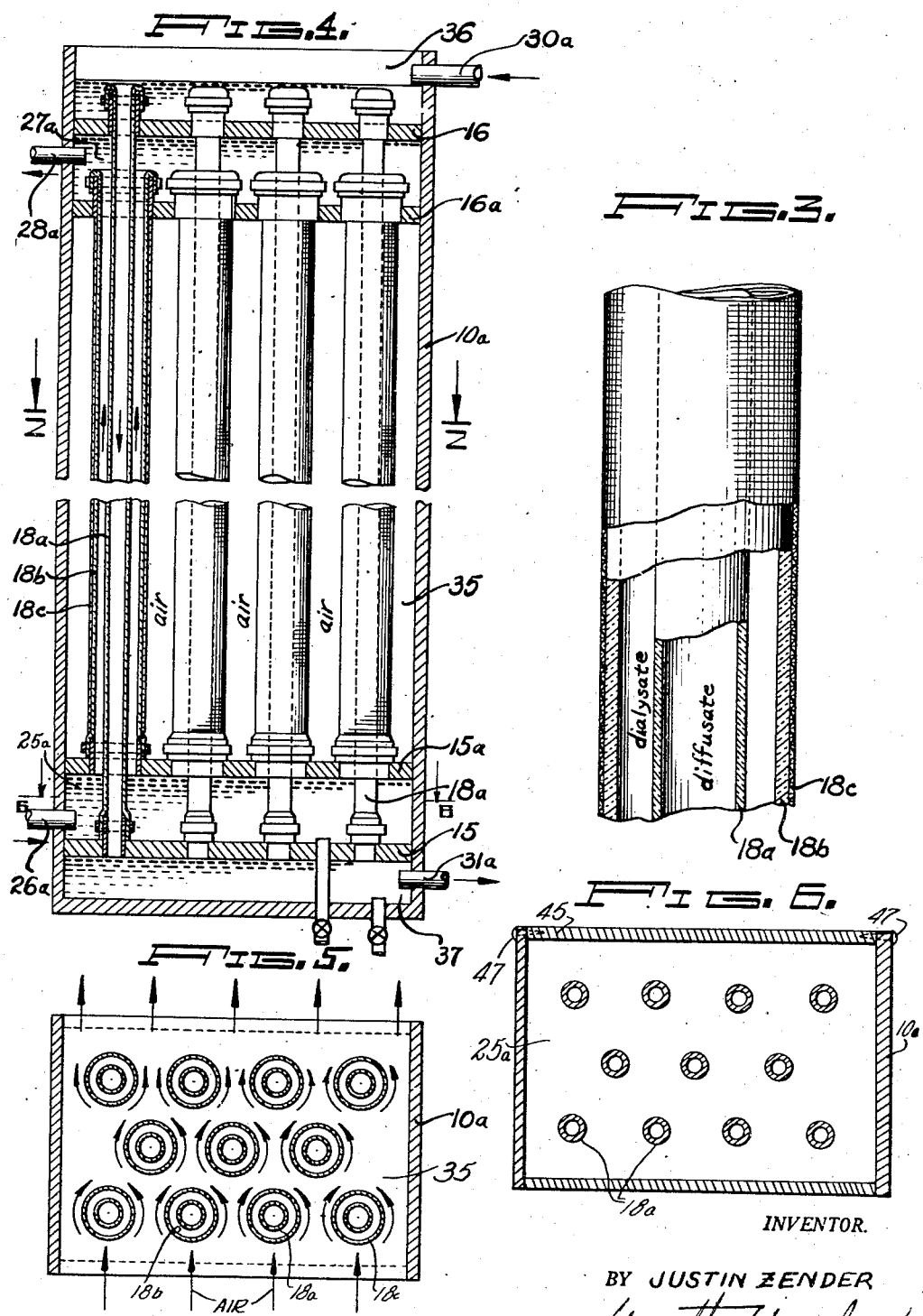

2,411,238

UNITED STATES PATENT OFFICE 2,411,238

PROCESS AND APPARATUS FOR DIALYZING SOLUTIONS

Justin Zender, Fredericksburg, Va., assignor to Sylvania Industrial Corporation, Fredericksburg, Va., a corporation of Virginia Application July 8, 1943, Serial No. 493,918

7 Claims. (Cl. 210—8.5)

1

The invention relates in general to dialysis, and, in particular, to a process and apparatus for the separation of a soluble substance from its solution by dialysis, and to correlated improvements designed to enhance the structure and function and to extend the uses of such apparatus.

It has been proposed to dialyze soluble materials from their aqueous solutions through hydrophilic membranes, such, for example, as sheets of regenerated cellulose, parchment paper, and the like. However, dialyzers employing membranes in the form of flat sheets have certain inherent disadvantages. For example, the edges of the sheets must be maintained under pressure or firmly sealed to avoid loss of liquid during dialysis. To clean the apparatus or to replace a broken sheet, it is generally necessary to completely dismantle the dialyzer. Further, to decrease breakage, the membranes must be supported over their surfaces. Finally, such prior apparatus did not provide any means for retarding the dilution of the solution being dialyzed. Thus, sheet dialyzers of prior design have generally been complicated in construction, difficult to repair or to clean and capable of handling only small volumes of liquid.

Accordingly, it is a general object of the present invention to provide a dialyzer which will be capable of handling large volumes of liquid and which will operate rapidly.

It is a further general object to provide a dialyzing apparatus which is easy to construct and to clean and in which broken membranes may be replaced without completely dismantling the dialyzer.

It is another object of the invention to provide a process for the separation of water-soluble substances from their aqueous solutions in a rapid and efficient manner, and in particular for the separation of products of fermentation from the fermented liquor.

A specific object is to provide an apparatus having means for retarding the dilution of the solution being dialyzed.

Other objects of the invention will in part be obvious and will in part appear hereinafter.

According to the present invention, there is provided an apparatus for the dialysis of solutions comprising, in combination, a chamber, a multiplicity of tubular dialyzing membranes disposed therein, means to pass the solution to be dialyzed into contact with one surface of the tube, means to pass another liquid into contact with the other surface of the tube, and preferably means to continuously concentrate the solution being dialyzed so as to increase the rate of dialysis.

2

In the now preferred embodiment the apparatus comprises a chamber having headers disposed transversely adjacent each end to divide the chamber into three separate compartments, tubular dialyzing membranes connected at each end to the headers and communicating with a common liquid compartment, and means for passing a fluid around the tubes in the central compartment.

In the following specifications and in the appended claims, the term "dialyzate" will be used to designate the solution being dialyzed in accordance with recent usage in the art; the term "diffusate" will designate the solution of the material which diffuses through the membrane during dialysis, and the term "dialysis" will be used to designate the diffusion of soluble substances through a semi-permeable membrane from one liquid into another.

The invention accordingly comprises the features of construction, combinations of elements, and arrangement of parts which will be exemplified in the construction hereinafter set forth and the scope of the invention will be indicated in the claims.

For a more complete understanding of the nature and objects of the invention, reference should be had to the accompanying drawings in which Fig. 1 represents a side elevation, partly in section, of one embodiment of the apparatus of the invention;

Fig. 2 represents a cross-sectional view of the dialysis chamber of the apparatus of Fig. 1 taken along the line 2—2 thereof;

Fig. 3 is a side elevation, partly in section, of one of the dialyzing tubes used in a second embodiment of the apparatus;

Fig. 4 is a side elevation, partly in section, of the dialyzer of the invention utilizing a double tube;

Fig. 5 is a top plan view, in section, of the apparatus of Fig. 4 taken along the line 5—5 thereof; and Figure 6 is a top plan view in section of the apparatus of Figure 4 taken along the line 6—6 thereof.

In that embodiment of the apparatus shown in Figs. 1 and 2, the dialyzing chamber proper comprises a vertical outer chamber 10, which is shown as a cylindrical chamber, but which may be of any cross-sectional shape. The chamber is closed at the top by a removable plate 11, and is closed at the bottom by a conical base 12, which is provided with a drain 13 having a valve 14.

Situated adjacent the ends inside the chamber 10, there are positioned headers 15 and 16, each provided with a plurality of holes. Short sections of pipe 17 are threaded into the upper header 15 and similar sections of pipe 22 are threaded into the lower header 16. These pipes serve to anchor the dialysis tubes 18 to the headers.

The chamber 10 is provided with a removable side portion 38 which makes the interior accessible from the outside. When it is desired to change or replace a tube, the apparatus is drained, the bolts 39 removed, and the side portion 38 of the chamber and the plate 11 taken out. The upper end of the tube is then pulled through the section of pipe 17, and the end turned down over the upper end of the pipe 17 to form the cuff 23. The band 24, which may be formed of rubber, as shown, or of metal or the like, is then slipped over the cuff 23, anchoring it securely to the pipe 17. A band 24' similar to the band 24 is then slipped over the free lower end of the tube 18, and the end of the tube inserted over the upper end of the lower pipe 22. The band 24' is then slipped down over the end of the tube 18, anchoring it securely to the pipe 22. The coupling shown in Fig. 1 has the advantage of maintaining the maximum diameter of the tube 18 at the joint, and thus does not interfere with the flow of the liquid through the tube 18.

The dialysis tubes 18 may be disposed and arranged within the chamber 10 in any desired manner, in rows, for example, or in concentric circles as shown in Fig. 2. The space between the tubes can be varied as desired, but in general a distance of the order of ½ to 1 inch is sufficient. It is to be understood that a space exists around all of the tubes illustrated in Fig. 2, and that none of these tubes are in direct contact with each other along their longitudinal surfaces.

It is to be understood that the apparatus shown in Fig. 1 may be constructed and arranged so that the dialyzate may be caused to pass inside the tubes or outside the tubes, but for the purpose of illustration only, the apparatus of Fig. 1 is constructed and arranged so that the dialyzate can be introduced into the lower section 25 of the chamber 10 by means of the pipe 26, the dialyzate filling the lower section of the pipe upward through the interior of the tubes 18 and filling the upper section 27 until it overflows through the outlet 28. The diffusate will be introduced into the intermediate chamber 29 at the top through the pipe 30 and will be removed at the bottom through the pipe 31. It is to be understood that the circulation of the dialyzate and/or of the diffusate may be continuous or intermittent. When it is desired to clean the apparatus, the dialyzate may be drained off through the exhaust pipe 13 which is positioned at the lowermost point of the bottom section 25.

It should be noted that the present apparatus is so constructed that the dialyzing tubes 18 are completely submerged in liquid so that no portion is in contact with the air. This is a desirable feature since it has been found that certain membranes, particularly those formed of non-fibrous cellulosic materials, are attacked by certain bacteria or organisms found in fermented sugar solutions and molasses resulting in the rapid deterioration of the membrane. This action is avoided or substantially retarded when the membranes are completely submerged in the liquid, and precautions are taken to avoid introducing bubbles of air in either of the liquids. It is also to be understood that the apparatus of the invention can be arranged without transcending the scope of the invention so as to provide that the dialyzate and the diffusate both flow upward or downward in the same direction instead of flowing countercurrent to each other as shown in Fig. 1.

Further, the apparatus of the type shown in Fig. 1 may be so readily modified by anyone skilled in the art, without transcending the scope of the present invention so that the chamber 10 and the tubes 18 are disposed in a horizontal plane. Inasmuch as the tubes 18 during operation are not only completely filled with liquid but also are completely surrounded by liquid, the tubes will require little or no horizontal support. If the tubes 18 are filled with dialyzate, which has a higher specific gravity than the diffusate, the tubes will tend to float so that they can be kept in position merely by suitable guide pins.

There is also shown in Figs. 3, 4, 5 and 6 another embodiment of the apparatus of the invention in which the dialyzing tubes are double or multiwalled. Referring to Fig. 3, this embodiment comprises an inner dialyzing tube 18a surrounded by a dialyzing tube 18b of larger diameter, and, if necessary, supported externally by means of a textile tube 18c made of an open mesh fabric whether of woven, knitted, or braided construction. The surrounding outer dialyzing tube 18b is particularly advantageous when it is desired to concentrate the dialyzate while it is being subjected simultaneously to dialysis. Thus a plurality of the tubes illustrated in Fig. 3 may be supported between the headers as shown in the apparatus of Fig. 4, leaving an air space 35 between the tubes. The side walls of the chamber 35 are solid as shown in the figure. However, there are no front and back walls to the chamber 35, as is fully brought out in Figure 5. Thus it is possible to blow air through the chamber 35 across the outer surface of the tube 18c, thus causing an evaporation of liquid through the wall of the tube 18b, as shown in Figure 5.

Positioning the double tubes in the chamber 10a requires the use of double headers at the top and bottom of the chamber. Accordingly, the outer tubes 18b and 18c are affixed to the inner headers 15a and 16a, while the inner tube 18a is affixed to the lowermost header 15 and the uppermost header 16. In this embodiment, it is preferable to have the dialyzate occupy the space between the tubes 18a and 18b, and to have the diffusate occupy the space in the interior of the tube 18a. Accordingly, referring to Fig. 4, the dialyzate is introduced into the lower section 25a through the inlet tube 26a so that it fills the lower section and rises through the space between the tubes 18a and 18b and fills the upper section 27a and flows out through the exit tube 28a. The diffusate can be introduced at the top of the chamber into the section 36 through the pipe 30a, whereupon it fills this section and flows down through the interior of the tube 18a and fills the lower section 37 from which it passes through the exit tube 31a.

Since the front and back walls of the chamber 35 are open, it is a simple matter to affix the tubes 18b and 18c to the header 15a. In order to provide access to the inner tubes 18a in the chamber 25a and to the upper parts of the outer tubes 18b and 18c in the chamber 27a and the upper part of the inner tubes 18a and the chamber 36, removable front portions are provided in the walls of the chambers. A typical construction of the walls of each of these chambers is shown in Figure 6 which represents a cross-sectional view of the chamber 25a taken along the line 6—6 of Figure 4. The removable front wall portion 45 is affixed to the apparatus wall 10a by means of the bolts 47. Similar removable wall portions are provided in chambers 27a and 36.

During the operation of the apparatus shown in Figs. 4 and 5, the soluble substances are caused to diffuse from the layer of dialyzate which passes in the space between the tubes 18a and 18b into the diffusate which is flowing through the interior of the tube 18a. Simultaneously, water or solvent from the diffusate will be flowing through the tube 18a into the dialyzate thus diluting the dialyzate. If the procedure of dilution is not retarded, it will result in the slowing down of the process of dialysis, the rate of which depends upon the difference in concentration of the soluble material between the dialyzate and the diffusate. Thus, according to one embodiment of the present invention, air is blown over the outside of the multiwalled tube so that water is continuously evaporated from the diffusate through the wall 18b and through the open mesh fabric 18c. It has been found, for example, that when the tube 18b is formed of regenerated cellulose and the diffusate is an aqueous solvent, the rate of evaporation of water through the regenerated cellulose tube 18b is the same as the rate of evaporation from the same solution contained in a bath. In other words, the rate of evaporation appears to be independent of the membranes. This appears to be due to the fact that the water diffuses in the wall of the tube 18b and evaporates from its external surface. Thus, the present invention provides a process and apparatus by which the dialysis can be carried out simultaneously with the concentration of the dialyzate so that the decrease in the rate of dialysis resulting from dilution of the diffusate can be substantially retarded or prevented. Preferably, the air which is caused to flow over the tube 18c is air heated to an elevated temperature of the boiling point of water, but preferably between 50 and 60° F. The heat transferred to the dialyzate is thus advantageous in preventing further fermentation and increasing the rate of dialysis. Any conventional air blower and air heater may be employed.

For treating aqueous liquid compositions, the tubes 18, 18a and 18b may be formed of any hydrophilic film-forming material, such, for example, as parchment paper, tubes made from leather waste as sold under the trade names "Brechteen" and "Naturin" and tubes made from any film-forming non-fibrous cellulosic materials as a class. For the treatment of aqueous fluid compositions where it is desired to cause the diffusion and separation of water or water-miscible organic compounds from inorganic or organic substances whether liquid or solids, there is preferably employed a hydrophilic cellulosic tube such, for example, as one formed of regenerated cellulose or cellulose hydrate which has been produced by regeneration from viscose or from solutions of cellulose in inorganic or organic solvents or from cuprammonium cellulose or by the de-esterification of cellulose esters such as by the denitration of cellulose nitrate, also membranes formed of alkali-soluble, water-insoluble cellulose ethers, gelatine (insolubilized), casein, alginates, and the like film-forming hydrophilic plastic materials. Such tubes are employed in the wet gel state, i. e., while they are swollen with water.

On the other hand, when it is desired to separate a hydrophilic organic liquid from water or organic compounds of a different type there may be employed tubes formed of hydrophobic colloidal materials as a class of which there may be given by way of example, tubes formed of synthetic resins such as polyvinyl resins, methyl methacrylate resins, chloroprene, nylon, chlorinated rubber and the like, or from an organic solvent-soluble cellulose derivative such, for example, as a cellulose ester, cellulose ether, mixed cellulose ester, mixed cellulose ether, a mixed ether ester of cellulose, as well as tubes formed of two or more resins or two or more cellulose derivatives, also tubes formed from a mixture of a hydrophobic resin with a hydrophobic cellulose derivative. When hydrophobic tubes are employed they are preferably used in the swollen gel state, i. e., while they are saturated with the organic liquid which it is desired to evaporate through the tube.

The present apparatus is adapted for dialyzing both organic and inorganic substances from organic or aqueous solutions. On the one hand, organic substances may be separated from aqueous or non-aqueous organic solutions by use of a semi-permeable hydrophobic tubing, while on the other hand water-soluble substances may be separated from aqueous solutions by use of a hydrophilic tubing. Accordingly, the present apparatus may be used for separating inorganic or organic crystalloids from their solutions, or for separating crystalloids from colloids, or for separating inorganic substances from organic substances, or for separating organic liquids from aqueous or non-aqueous solutions. In particular, the apparatus is applicable for the separation of glycerine, butylene glycol, citric acid, sugar and inorganic salts and the like, from their aqueous solutions.

The heating of the dialyzate from 70 to 100° C. serves a four-fold purpose: (a) to continuously concentrate the dialyzate since water is evaporated in the evaporator; (b) to increase the rate of dialysis; (c) to eliminate dissolved air and air bubbles; (d) to sterilize the dialyzate and prevent further fermentation.

The apparatus has many advantages, namely, the dialyzing membranes being in the form of a tube are more self-supporting than flat sheets and they can be readily anchored at each end without danger of leaks. When a tube breaks, the liquid may be quickly drained from the apparatus and a tube replaced without dismantling the entire apparatus. Since the tubes are not constricted at the entrance or exit where they are joined to the headers, the flow of liquid therethrough is not retarded and there is no tendency for sediment to collect inside the tube; further, a rapid flow can be maintained through the tubes. Thus, there is provided a means for continuously concentrating the dialyzate while preventing the rate of dialysis from dropping too rapidly, thereby resulting in an increase in the yield.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. An apparatus for the dialysis of solutions comprising, in combination, a chamber, a multiplicity of tubular dialyzing membranes comprising outer tubes of relatively large diameter and tubes of relatively small diameter disposed in said tubes of large diameter, means spaced within said chamber supporting said tubular dialyzing membranes, means to pass the solution to be dialyzed through the outer tube into contact with one surface of the inner tube, means to pass another liquid through the inner tube into contact with the other surface of the inner tube, and means to continuously concentrate the solution being dialyzed so as to increase the rate of dialysis.

2. An apparatus for the dialysis of solutions comprising, in combination, a chamber, a multiplicity of tubular dialyzing membranes, comprising outer tubes of relatively large diameter and tubes of relatively small diameter disposed in said tubes of large diameter having tubular support tubes for the outer tube comprising an open mesh fabric, disposed therein, means spaced within said chamber supporting said tubular dialyzing membranes, means to pass the solution to be dialyzed through the outer tube into contact with one surface of the inner tube, means to pass another liquid into contact with the other surface of the inner tube, and means to continuously concentrate the solution being dialyzed so as to increase the rate of dialysis.

3. An apparatus for the dialysis of solutions comprising, in combination, a chamber having inner and outer headers disposed transversely adjacent each end and defining a space between them, dialyzing membranes in the form of inner and outer concentric tubes of different diameters disposed in said space and connected at each end to said headers, the inner tube being connected to the outer headers and the outer tube being connected to the inner headers, means to pass a solution through the inner tube, means to pass a different solution through the space between the inner and the outer tube, and means to pass a fluid on the outside of the outer tube.

4. An apparatus according to claim 3 in which there is provided means for passing air over the surface of the outer dialyzer tube so as to evaporate liquid from the surface of said tube.

5. A process for the dialysis of solutions comprising passing the solution to be dialyzed into contact with one surface of a dialyzing membrane in the form of a tube, passing another liquid into contact with the other surface of said tube, and continuously concentrating the solution being dialyzed at a point spaced from the dialyzing membrane, and continuously recirculating the concentrated solution, whereby the concentration gradient between the dialyzate and the diffusate is maintained at its highest level throughout the dialysis process.

6. A process for dialyzing solutions comprising passing the solution to be dialyzed through an outer tubular dialyzer, in contact with an inner tubular dialyzer which is concentric with the first tubular dialyzer, passing another liquid through and in contact with the inner tubular dialyzer, and passing air over the external surface of the outer tubular dialyzer whereby a liquid is caused to be evaporated from said dialyzer.

7. A process for dialyzing solutions comprising passing the solution to be dialyzed through a tubular dialyzer of relatively large diameter in contact with tubular dialyzer of smaller diameter which is disposed inside said larger tubular dialyzer, passing another liquid through and in contact with the tubular dialyzer of smaller diameter, and passing a third fluid over the external surface of the larger tubular dialyzer.

JUSTIN ZENDER.